United States Patent [19]

Criswell et al.

[11] Patent Number: 5,081,629
[45] Date of Patent: Jan. 14, 1992

[54] FAULT ISOLATION FOR MULTIPHASE CLOCK SIGNALS SUPPLIED TO DUAL MODULES WHICH ARE CHECKED BY COMPARISON USING RESIDUE CODE GENERATORS

[75] Inventors: Peter B. Criswell, Bethel; Michael J. Stella, Brooklyn Park, both of Minn.

[73] Assignee: Unisys Corporation, Blue Bell, Pa.

[21] Appl. No.: 641,626

[22] Filed: Jan. 16, 1991

Related U.S. Application Data

[63] Continuation of Ser. No. 350,355, May 8, 1989, abandoned.

[51] Int. Cl.⁵ .......................... G06F 7/72; G06F 11/00
[52] U.S. Cl. ......................................... 371/61; 371/54; 371/68.3; 364/739
[58] Field of Search .................. 371/54, 68.1, 68.3, 371/69.1, 61; 364/739

[56] References Cited

U.S. PATENT DOCUMENTS

| | | | |
|---|---|---|---|
| 2,996,248 | 8/1961 | Abbott | 371/68.1 |
| 3,660,646 | 5/1972 | Minero et al. | 235/153 |
| 3,873,820 | 3/1975 | Parr et al. | 235/153 |
| 3,931,505 | 1/1976 | Sevcik | 371/68.3 |
| 4,181,969 | 1/1980 | Smith, Jr. | 364/739 |
| 4,213,188 | 6/1980 | Smolko et al. | 364/739 |
| 4,233,682 | 11/1980 | Liebergot et al. | 371/68.1 |
| 4,236,446 | 12/1980 | Lovrich et al. | 371/54 |
| 4,265,173 | 5/1981 | Takahashi et al. | 101/79 |
| 4,471,484 | 9/1984 | Sedmak | 371/27 |
| 4,670,880 | 6/1987 | Jitsukawa et al. | 371/69.1 |
| 4,686,677 | 8/1987 | Flora | 371/61 |
| 4,691,219 | 9/1987 | Bose et al. | 371/54 |
| 4,752,904 | 6/1988 | Paul | 364/739 |
| 4,792,955 | 12/1988 | Johnson et al. | 371/68.1 |
| 4,800,564 | 1/1989 | DeFazio et al. | 371/61 |
| 4,853,932 | 8/1989 | Nitschke et al. | 371/68.3 |
| 4,924,467 | 5/1990 | Criswell | 371/68.1 |
| 4,926,374 | 5/1990 | Schaffer | 364/739 |

OTHER PUBLICATIONS

Avizienis, Algirdas, "A Study of the Effectiveness of Fault-Detecting Codes for Binary Arithmetic", Jet Propulsion Laboratory California Institute of Technology, Technical Report No. 32-711, Sept. 1965, pp. 10-16.

Paal, Dr. Frank F., "Implementation of Residue Number Arithmetic Checking Compatible with Fast Arithmetic Processing", California State University, Long Beach, CA.

Primary Examiner—Jerry Smith
Assistant Examiner—Patrick D. Muir
Attorney, Agent, or Firm—Glenn W. Bowen; Mark T. Starr

[57] ABSTRACT

A clock error detection system is provided for a data processing system that employs multiphase clock signals and dual, substantially identical electronic modules. The clock error detection system employs one clock error detection circuit on one module and a second clock error detection circuit on the other electronic module. An error collector is coupled to the first and second clock error detection circuits on both modules to receive the fault signals. Two complementary residue code generators with different moduli are used in each electronic module to generate clock phase error detection signals, which may be used to detect either missing or extra clock phases.

12 Claims, 6 Drawing Sheets

FAULT ISOLATION FOR MULTIPHASE CLOCK SIGNALS SUPPLIED TO DUAL MODULES WHICH ARE CHECKED BY COMPARISON USING RESIDUE CODE GENERATORS

This is a continuation of co-pending application Ser. No. 07/350,355 filed on May 8, 1989, abandoned.

BACKGROUND OF THE INVENTION

1. Field of the Invention

This invention relates generally to a method and apparatus for detecting the occurrence of clock errors in digital computing systems, and, more particularly, to such a system in which arithmetic operations are carried out simultaneously in two identical hardware modules, the results are compared and complementary residue codes are used to detect missing clock phases in a multiple phase clock system.

2. Discussion of the Background

Error detection for clock signals can be one of the most difficult errors to trouble-shoot because errors can manifest themselves in many ways. In a system with extensive logic dedicated to capturing sufficient information to permit a First Time Occurrence (FTO) software analysis, the possibility of a clock error is especially troublesome because a clock error could mean the captured data may not be believed. The present invention provides for the detection of failing clock signals, and a measure of confidence that a clock signal error has not corrupted captured data.

The detection of clock signal errors is especially troublesome in an environment where a software analysis is used to automatically interpret the captured data, because clock errors can greatly distort the values which are captured. Failure of a clock phase can result in not gating functional registers, or the compare and capture registers themselves. Without the ability to detect whether or not these clock signals have failed, the driver modules for these signals would always have to be considered as possible sources of failure, which can lead to needless swapping of the modules in an attempt to fix the problem. Detection of clock errors is highly desirable, both for the case when the signals fail because the fault is immediately identified as a clock signal fault, and for the case when they do not, because the absence of a clock error detection eliminates the driver modules from consideration. This adds to the credibility of the values captured in the compare and capture registers.

SUMMARY OF THE INVENTION

The invention involves a clock signal fault isolator which includes a first clock error detector on one electronic circuit module and at least one other second clock error detector on another identical electronic circuit module. An error collector is coupled to the first and second clock error detectors to receive fault signals. The first and second error detectors each includes a plurality of clock sensors each of which are coupled to receive multiphase clock signals from its own circuit module which originated from a common clock source. Each clock sensor provides a series of sensed signals which are representative of the multiphase clock signals of the associated electronic circuit. First and second residue code generators are coupled to receive the sensed signals from both of the first and second clock error detectors. The first residue code generator is constructed to generate first code signals of a first modulo, and the second residue code generator is constructed to generate second code signals of a second modulo that is different than the first modulo. A first comparator has inputs that are coupled to receive both of the first code signals from each of said electronic circuit means. A second comparator has inputs coupled to receive both of the second code signals from each of said electronic circuit means, and an error indicator is coupled to the first and second comparator to indicate any clock phase errors that may have occurred.

BRIEF DESCRIPTION OF THE DRAWINGS

The present invention is described by reference to the drawings in which:

FIGS. 3a and 3b represent an overall, more detailed block diagram of the module clock error detectors of FIG. 1, and FIGS. 4a–4e are timing diagrams that illustrate the operation of the embodiment of FIG. 2.

TECHNICAL DESCRIPTION OF THE INVENTION

Fault isolation in large electronic modules, such as an arithmetic section of an instruction processor, is most effective if it can be done using a FTO analysis. Such an analysis is based on the data captured in the hardware at the time of the error. The effectiveness of FTO analysis is dependent on the error detection coverage and the amount of data captured.

Figure 1:
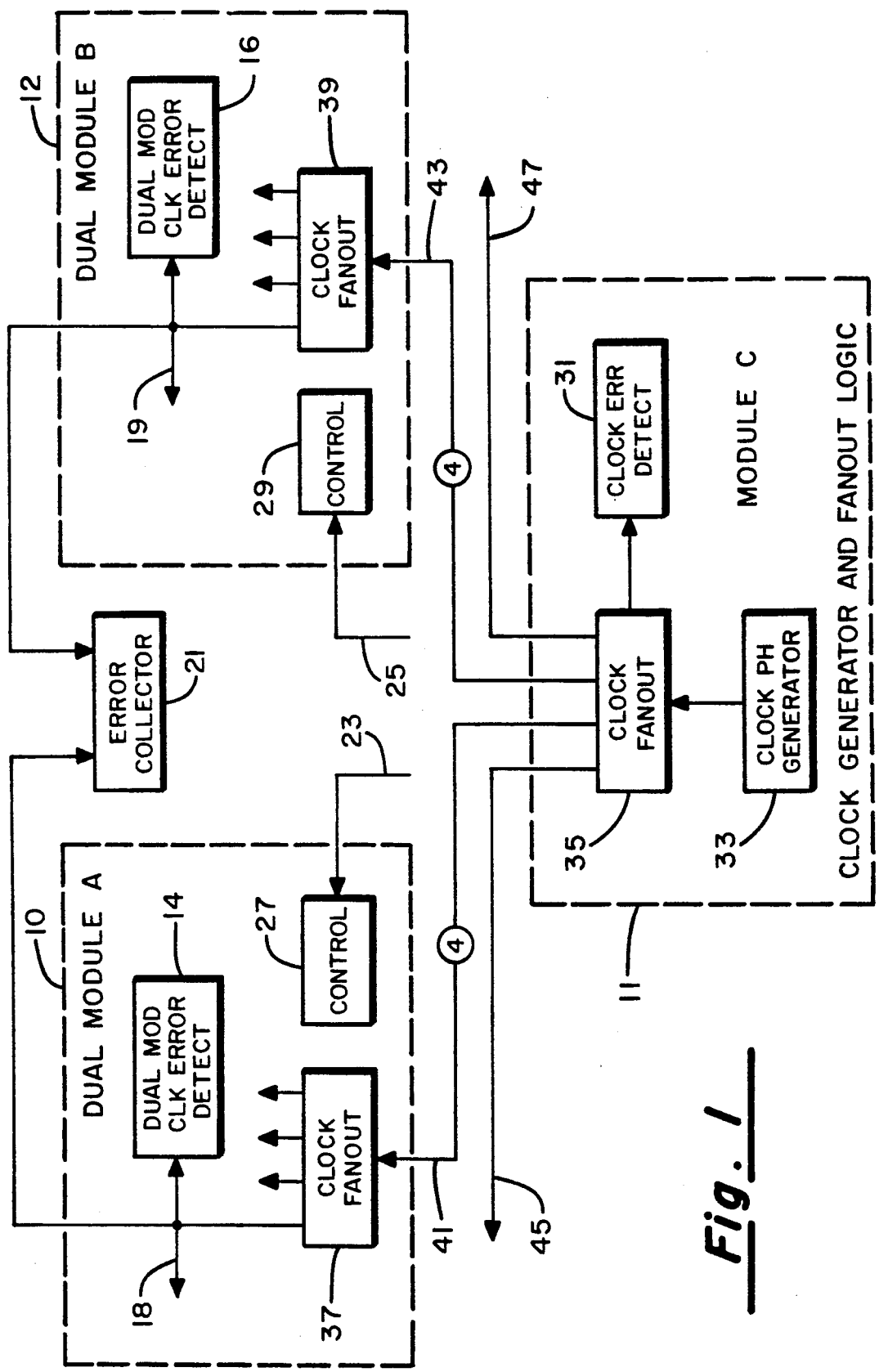
FIG. 1 is a block diagram of a multi-phase clock system which drives dual instruction processor modules each of which includes its own clock error detector.

FIG. 1 shows a block diagram of a system with identical dual instruction processors which are checked by comparison using complementary residue code techniques. Residue coding is a technique which can be used to check computer operations. It has the advantage of working well to check arithmetic operations, and its error detection coverage can be increased by choosing a large modulus. In terms of a duplication and comparison checking utilization, both sets of bits to be compared can generate their corresponding residue codes, and only the residue codes need to be compared thus obtaining fairly high error coverage while requiring much fewer interface signals to be compared than the original set of bits.

A method of implementing residue code generators using a carry-save-adder tree and a full adder is known. This method allows the building of such generators with a reasonable amount of logic which are fast enough to be utilized in a comparison implementation. The employment of dual module residue code techniques to detect corrupted data is disclosed in United States patent application Ser. No. 235,425, entitled "System for Checking Duplicate Logic Using Complementary Residue Codes to Achieve High Error Coverage with a Minimum of Interface Signals," filed Aug. 24, 1988 in the name of Peter B. Criswell and assigned to the assignee of the present invention. This patent application is hereby incorporated by reference into this document.

Figure 2:
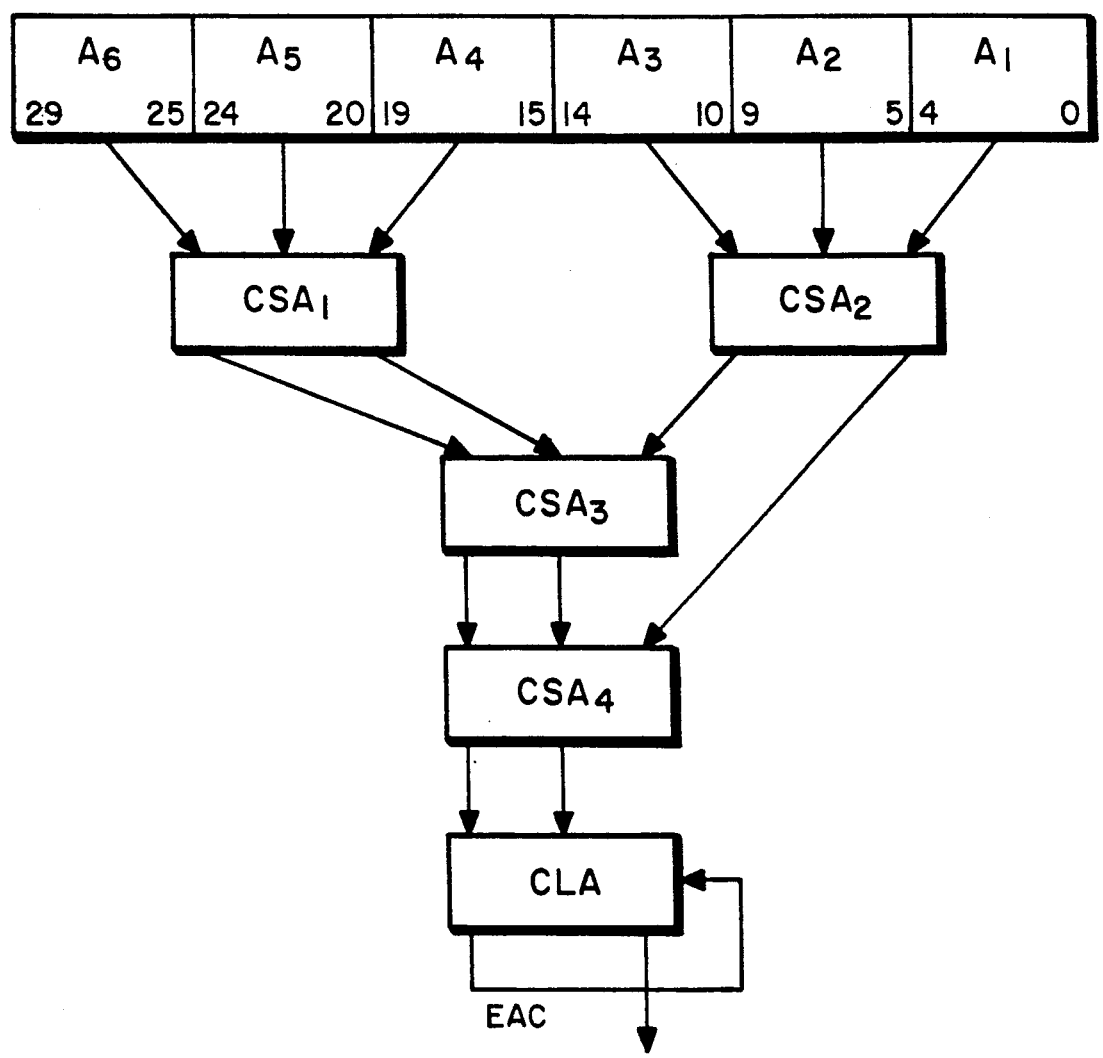
FIG. 2 is a block diagram of a carry-save adder tree that is used in the present invention.

In FIG. 2 a prior art method is illustrated in which cascaded carry-save adders are used to perform residue arithmetic checking. For example, assume a modulo, m, of 31 is chosen, and the data to be compressed is contained in a 30-bit accumulator, or AI register. The effect of the residue generator is to treat the accumulator input as a binary number, which is divided by the modulo, i.e., 31, and the output is the residue or remainder resulting from this division. Accumulator segments A6, A5 and A4 are presented as inputs to the 5-bit carry-save-adder 1. Similarly, accumulator segments A3, A2 and A1 are coupled to carry-save-adder 2.

A carry-save-adder functions so that as addition proceeds when a carry is generated, the carry is discarded and a "1" is added in the least-significant bit position. This action is often referred to an "end-around carry." The sum and carry outputs of carry-save-adder 1, along with the carry of carry-save-adder 2 are provided as inputs to carry-save-adder 3. The carry and sum of carry-save-adder 3, along with the sum of carry-save-adder 2, are presented as inputs to carry-save-adder 4. Finally, the sum and the carry of carry-save-adder 4 are provided as inputs to the carry look ahead (CLA) adder which adds these inputs to generate the residue number. This technique is extendable to any modulo, m, which satisfies the equation $M = 2^k - 1$ where k=the number of bits per segment.

The most efficient way (i.e., the method that provides the highest coverage with the least number of interface signals), is to choose two complementary forms of the form $2^a - 1$, where the first code is $2^m - 1$ and the second code is $2^n - 1$, $m = n + 1$ and the first code is a m-bit code and the second code is a $n = m - 1$ bit code. The logic of this invention requires that each module send m signals of this kind to the other module for comparison and detection of all but $2^{2m-1} - 1$ error syndromes.

Referring again to FIG. 1, a block diagram of the dual module checking system is shown which is used by the present invention to detect clock errors. One of the two identical modules 10 is also shown in schematic form in FIG. 3, along with connections to the other module 11 which is shown in block form in this Figure. The dual modules 10, 12 labelled "A" and "B", are representative of a portion of logic which would be considered as a field replaceable unit, typically a printed circuit board module. Module 10 contains a dual mod clock error detector which includes a plurality of clock phase error circuits 15, (FIG. 3), that are monitored to detect clock errors in various portions of the circuitry of module 10. The other module 12 contains a dual module clock error detector 16 which is operated synchronously with the dual mod clock error detector 14 of the module 10 to perform error checking comparisons.

A block diagram of a representative clock error detector 14 is shown in FIG. 1. The detectors 14, 16 are used to provide error condition indications on lines 18, 19 and to provide information to an error collector 21, which is used to isolate the source of the errors. Since identical circuitry is used in both of the modules 10, 12, selection lines 23, 25 to control circuitry 27, 29 are required. In the described embodiment the two modules are presumed to be in the instruction processor of a computer. One of the lines 23, 25 may be hardwired to a logical "1" condition by means of a back-plane interconnection so as to designate one module, for example, module 10, as the "master" module. Then the select line of the lines 23, 25 that is connected to the other module will be hardwired to a logical "0" to designate module 12 as the "slave" module. By reversing the interconnection, the designations of both modules are reversed.

In the past the clock generator logic was checked within clock modules by conventional system clock error detectors, such as the detector 31. When the system clock error detector 31 in the C clock module 11 detected an error, it stopped the Instruction Processor (IP) immediately by stopping the clock inside the IP. A test module, (not shown), outside the IP can then determine the nature of the fault through known scan/set techniques.

Figure 3:
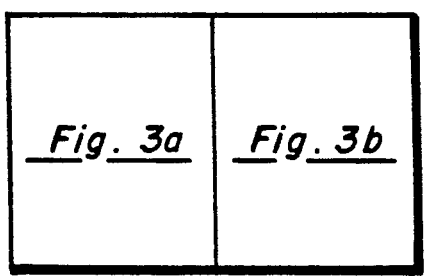
FIG. 3 represents a plot of how
Figure 3A:
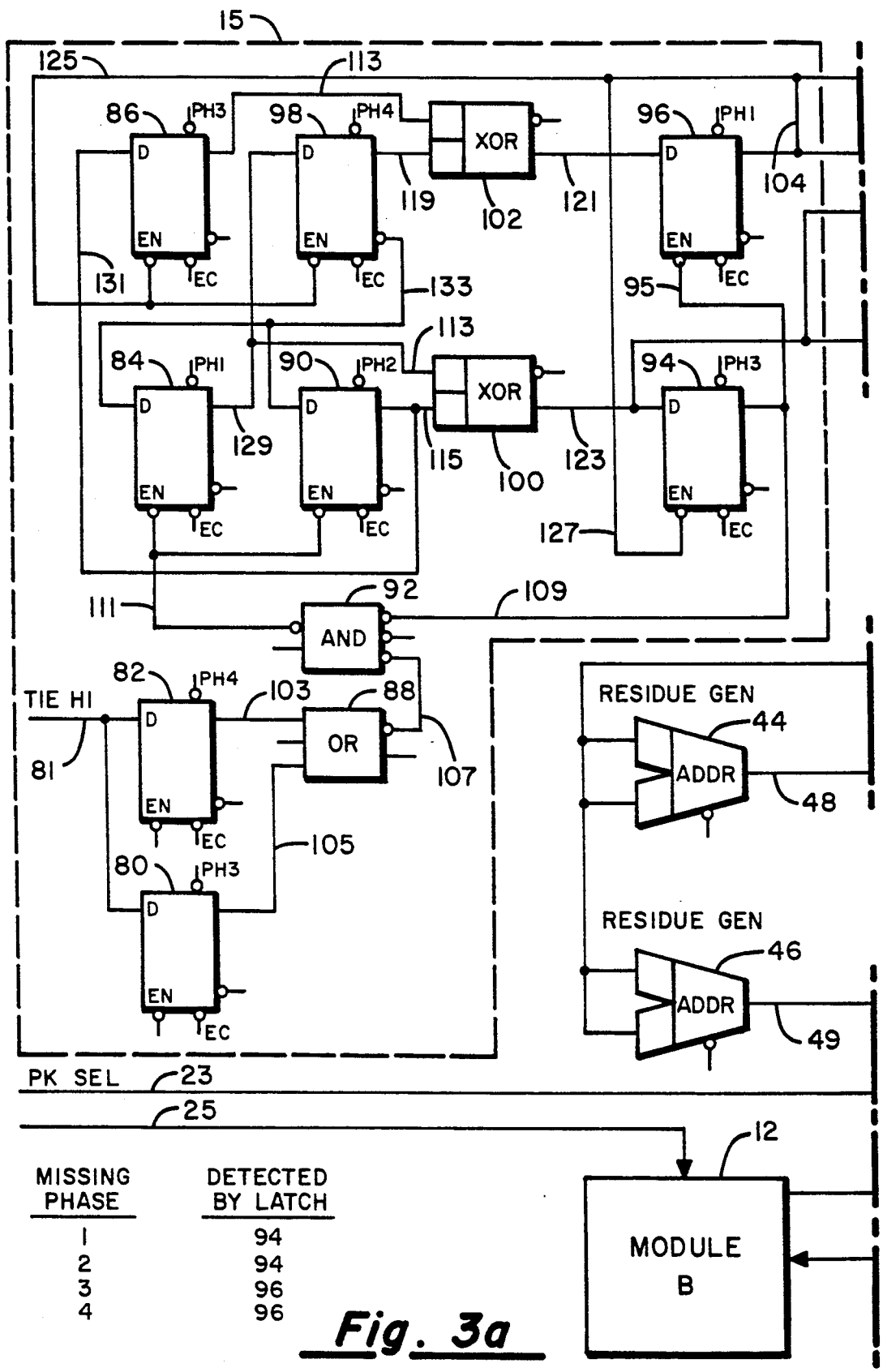
FIGS. 3a and FIG. 3b are aligned to form a complete FIG. 3 drawing.
Figure 3B:
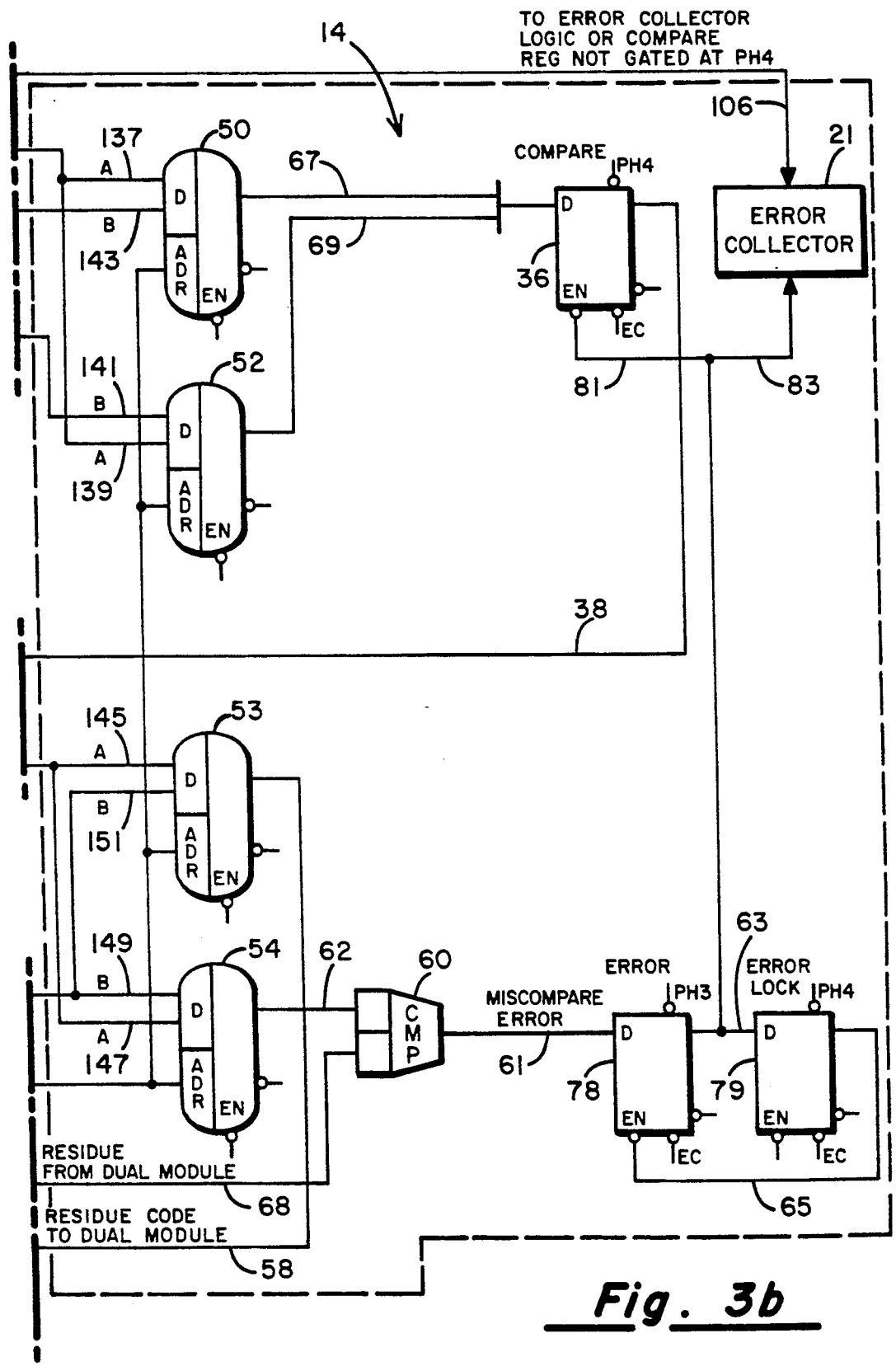

The dual module clock error detectors 14, 16 have different requirements than the system clock error detector 31. First, if they detect an error and the system clock error detector 31 does not, the IP will not stop the clock immediately. Instead it will handle the error as a normal hardware error, such as a parity error in a functional register. Therefore, clock error detectors 14, 16 indicate the error through the normal error collection logic even though, in the worst case, a clock phase may be missing completely in the module. Second, after the error is handled, (such as by providing an error logout), the error detector logic and functional logic will be cleared by an "error clear" (EC) signal which is issued with the clocks from the clock generator 33. This resets the functional logic to permit continued operation of the IP after the error handling sequencing. All the latches in FIGS. 3a and 3b are cleared by the EC signal which is issued after the error logout process during the hardware error interrupt handling sequencing. This permits the IP to handle the dual module clock error detection the same as any other miscompare that is detected by the dual modules.

The clocks from the clock generator 33 are supplied through the clock fanout circuit 35 to the modules 10, 12, and from there to the clock fanout circuits 37, 39 within these modules, respectively. A four-phase circuit is implemented in the described embodiment. Bus lines 41, 43 carry the clocks to the modules 10, 12, and the bus lines 45, 47 carry the clock to the other modules of the system (not shown).

The EC signal is asynchronous in that the delays from the fanout logic for its distribution are not required to meet a normal phase separation allowance for delay, which means the EC signal can "drop off" at a latch at any time relative to the clock phases. The system clock error detector 31 in the clock module 11 can depend on phase 1 being the first phase issued when there is no hardware but the error detectors 14, 16 must provide "resynching" logic to ensure that these detectors see phase 1 first, as will be discussed in more detail below with a reference to the timing diagrams of FIG. 4.

Outputs from the clock error detector 14 are captured in a parallel compare latch 36 in the A module 10. As shown in FIG. 3, the parallel latch 36 is represented as a single box or block, however, the latch 36 is actually implemented as a parallel group of latches, each of which is coupled to receive a different output bit from the clock error detector 14. In other words, the illustrated portion of the clock error detector 14 in FIG. 3, which includes the one-bit selectors 50, 52, represents circuitry for detecting clock errors in the circuitry of module 10. One or the other of these two selectors 50, 52 in either the A module 10 or the B module 12 are selected by the presence or the absence of a "1" logic level on the selection line 23. If a "1" is on the line 23, the selectors 50, 52 of module 10 provide a pair of outputs that represent the inputs B and A, respectively. Since a logic "0" signal is applied on the line 23 to the selection line 25, the outputs from the selectors 50, 52 of module 12 on the lines 67, 69 are logically inverted with respect to the corresponding outputs from module 10. An output bit pair in a four clock phase system is sufficient to indicate the absence of any of the four clock phases.

A number of pairs of selectors similar to the selector pair 50, 52, along with the corresponding phase error detection circuitry that feeds these selectors, (which are described in more detail below), may then be employed to detect clock errors originating from different areas of a module. The outputs of such additional selectors, and of other signals that may comprise the output of the parallel latch 36 may be coupled through the parallel latch 36 on a bus 38 to provide a group of Q output signals.

The Q outputs of the parallel latch 36 are thus treated as a single large binary word which is carried on a parallel bus 38 and is presented to the residue generators 44, 46, which may be implemented as carry-save adders in the manner described above with reference to FIG. 2. Residue generator 44 complements the modulo m residue of the signal on the bus 38, preferably by the method of cascaded carry/save adders as previously described, to generate a clock error code on output bus 48. If, for example, m=63, a 6-bit code is generated on bus 48, (i.e., with a 6-bit code, 32 different circuit portions of module 10 may be monitored for clock errors), similarly, residue generator 46 generates the modulo m−1 residue of input 38 and provides it to output bus 49. In this instance, the modulo is 31 and the residue code is a 5-bit code. To make the signals on the output buses 48, 49 of equal width, the signal on the output bus 49 has a "0" in its most significant bit, and the residue code comprises the remaining five bits.

It is important to note that the complementary residue codes allow detection of all error syndromes except those which are multiples of M multiplied by (M−1) which, in the example using modulii of 63 and 31, is 1953. Since 1953 is the product of the residue generator moduli, (i.e., 63 times 31), 1953 and all of its integer multiples will generate a "0" residue for both residue code generators.

The multi-bit selectors 53, 54 are conditioned by the select line 23 to select one of the two residue generators 44, 46 as outputs. If the module 10 is selected by the "master" module by forcing a logical "1" on line 23, the A input of selector 54 will be selected, along with the B input of the selector 53. This means that the output of the modulo m−1 residue generator 46 will be provided as an output from the master module 10, on the bus 58, while the output of the modulo m residue generator 44 on input B of the selector 54 will be provided as an input to a comparator 60 in module 10 via bus 62. A similar comparator in module 12 will then receive the outputs from the residue generator 46 of module 10. The comparator 60 in module 10, due to "0" signal on the line 25, correspondingly receives the output code of the residue generator 44 of module 12 through the selector 54, and the output code from the residue generator 46 of module 10 on the bus lines 68 of module 12. Again, if the logical signals on the lines 23, 25 are reversed, the roles of "master" and "slave" modules will also be reversed.

The contents of registers 36 of both modules are checked every cycle, and an error detection in either module will result in a corresponding error latch 78 being set. When the latch 78 is set, further operations are suspended by a "disable" signal on the enable inputs of the parallel latch 36 through the line 81. The error is indicated to the error collector 21 on the line 83. The error latch 78 receives a miscompare error signal from the comparator 60 when it is generated on the line 61 and is locked by the latch 79, which is coupled to the output of the latch 78 on the line 63, to guarantee that information is captured for fault isolation procedures. Locking is obtained through the feedback path on the line 65 from the Q output of the latch to the enable input of the latch 78. The latch 79 is permanently enabled by the open connection on the enable input of the latch 79.

Figure 4A:
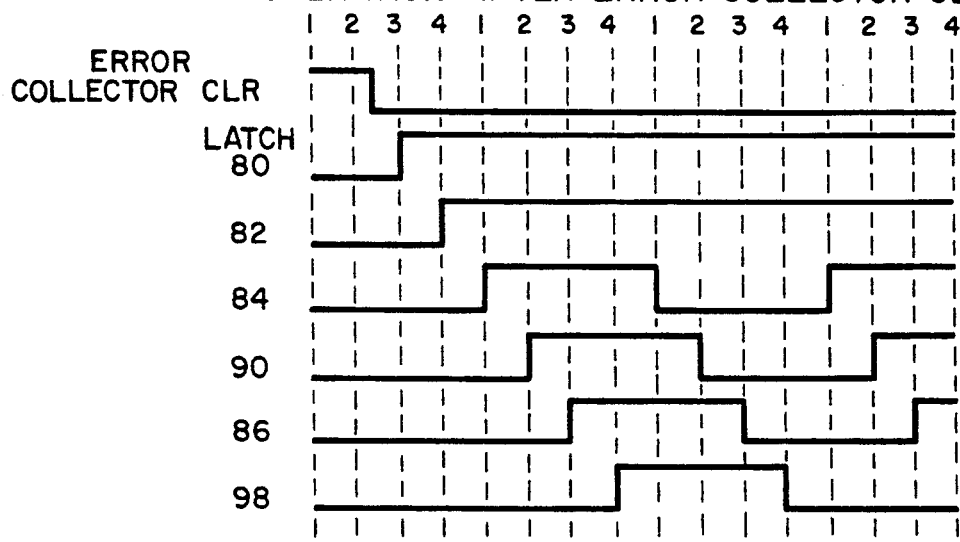

The timing diagram of FIG. 4a illustrates the normal case when no clock phases are missing. As shown in FIG. 4a if phase 3 is the first phase scanned after the EC signal goes low, the clock error latch 80 will be set and latch 82 will be set upon the occurrence of the next phase 4 clock. (The clock phase that activates each latch of FIG. 3 is shown at the top right-hand corner of the block that represents the latch.) Latches 80, 82 are used to resynchronize the error detection circuitry after an EC signal has cleared the error detection latches. Their D inputs are tied to a logic "1" on "Hi" level via line 81. Latch 80 or latch 82 must set before latches 84, 86 can be gated, which insures that the phase 1 latches will be strobed first. The outputs of the latches 80 and 82 are coupled on the lines 103, 105 to the OR gate 88 to cover the case when either a phase 3 or a phase 4 clock is missing entirely (e.g., a "stuck-at-inactive-fault") after the EC signal occurs. The enable inputs of latches 84, 90 are supplied by the AND gate 92 on the line 111 which has one input from the OR gate 88 on the line 107, and a second input on the line 109 from the output of the Latch 94. The output of Latch 94 is also supplied to the enable input of Latch 96 via line 95. If both clock phases 3 and 4 are missing the AND gate 92 will not enable latches 84, 90. The output of latch 84 is coupled to the input of latch 98 from the line 129. The output of latch 90 is coupled to the input of latch 86 on the line 131. The output of latch 98 is coupled to the inputs of latches 84, 90 on the line 133.

The "A" input to selector 50 from latch 96 and the "B" input to selector 50 from the XOR gate 100 are supplied on lines 137, 143, respectively The "B" input to selector 52 from the XOR gate 100 and the "A" input to selector 52 from the latch 96 are supplied on lines 141, 139, respectively. The "A" inputs to selector 53 and the "A" inputs to selector 54 are supplied on buses 145, 147, respectively, while the "B" inputs to selector 54 and the "B" inputs to selector 53 are supplied on buses 149, 151, respectively.

Latches 84, 90 are coupled to an Exclusive-OR gate 100 on the lines 113, 115, the output of which is coupled to the "B" input of the selector 52 on the line 141. In a like manner the Exclusive-OR gate 102 has inputs from latches 86, 98 on the lines 113, 119 and its output is coupled to the input of latch 96 via line 121, the output of which is coupled to the "A" input of the selector 50 on the line 137. Whenever both of the inputs to the Exclusive-OR gates 100, 102 are at the same logic level, whether it be a "1" or a "0" level at clock 3 or clock 1 phase times, the latches 94 and 96 will not be set. The system clock error detector 31 will have a good probability of detecting when clock phases are missing to both modules since it is probable that other modules in the IP will also generate clock errors in the detector 31 through inputs on the lines 45, 47. Latches 84, 98 (FIG. 4b) cannot be set when phase 1 clock is missing. Latches 86, 90 (FIG. 4c) cannot be when phase 2 clock is missing.

Figure 4B:
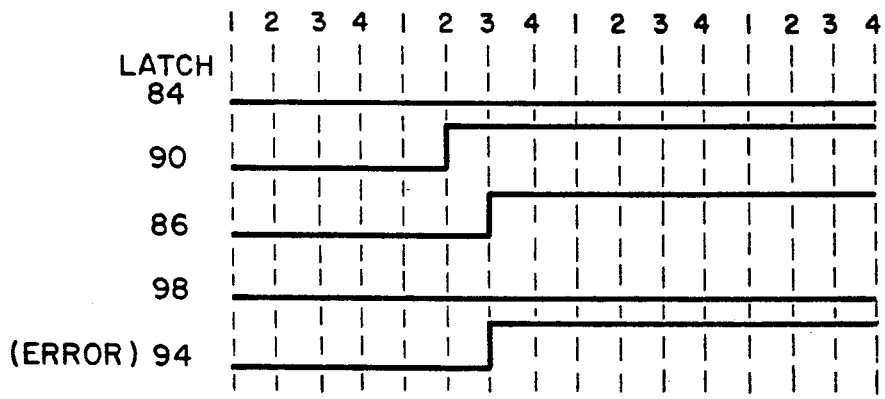
Figure 4C:
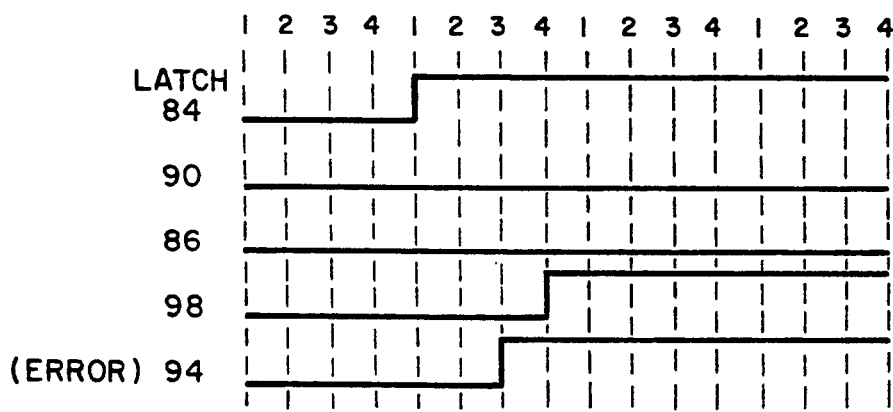
Figure 4D:
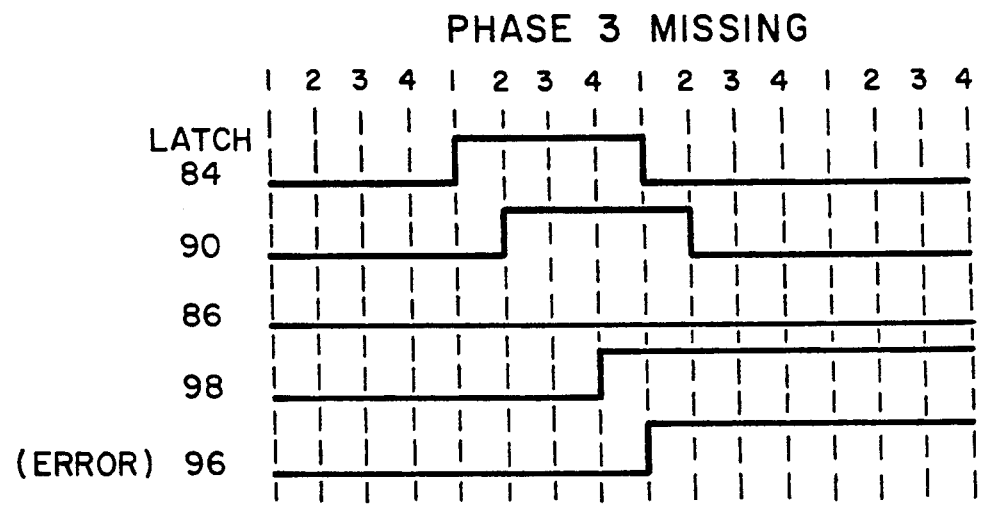
Figure 4E:
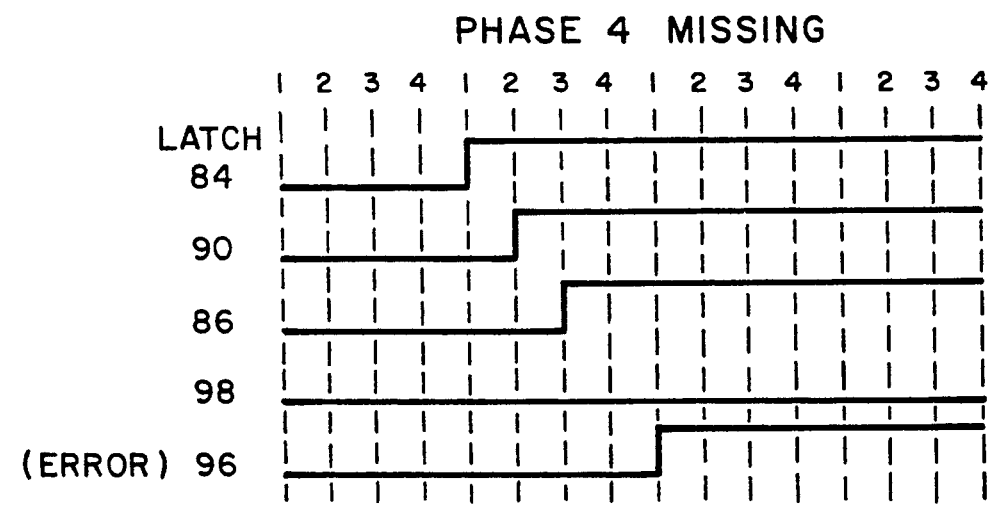

FIGS. 4b–4c show the timing signals that occur when each of the 4 clock phases are missing. If either of the error latches 94, 96 sets after the EC signal goes low, the latches 84, 86, 90, 98 which feed the XOR detectors 100, 102 will be locked-up, thus locking the error condition. To ensure that the error is reported even when a clock phase on one module has a "stuck-at-inactive" fault, the outputs from the error latches 94 associated with clock phases 1 and 2 and from the error latches 96 associated with clock phases 3 and 4 from one module are sent to the compare register 36 in order to compare the outputs of one dual module against the output of the other dual module.

Since one of the residue codes from each module is sent to the compare register of the other module for comparison, a path to the error collection logic is guaranteed for all error latches, except for the case when the missing phase has the same phase as the compare register 36. For example, if a phase 4 clock is the missing clock phase, another path, (such as the path provided by the lines 104, 106), must be found to the error collector logic in order to allow the error latch 96 to report a missing clock phase. The output of the error latch 96 on the line 104 is also used to enable latches 86, 94 and 98 via lines 125, 127. If both dual modules contain another pair of compare registers which are not clocked on phase 4, latch 96 can be included as an input to that register, or alternately it can be fed directly to the error collector logic 21 as long as it isn't staged through a phase 4 clocked latch that is internal to the dual modules. One advantage of tying the output of latch 96 to the compare register is that no additional module pins are required.

When both of the dual modules detect a clock error at the same time, the fault will be isolated to the clock error module 11, but not to either of the dual modules 10, 12. If the error latches 94, 96 were fed directly to both of the compare registers 36 of both modules 10, 12, a miscompare would not be detected when both modules detected the same phase error since the compare registers would contain the same values. To cover this case the selectors 50, 52 are used to "switch" the outputs of the XOR gates 100, 102 and the latches 94, 96 between the two A and B input bits of the compare register, dependent upon the select signal of the lines 23, 25 that designate which of the modules is the "master" and which one is the "slave". Use of the selectors 50, 52 is feasible because the error latches 94, 96 are only set when a clock error condition exists, and if one sets the other is prevented from setting.

From FIG. 1 it should be noted that the dual module clock checker of the present invention only checks one of the many branches of the clock fanout internal to the module. This is sufficient since its purpose is to determine whether or not the clock signal could have failed between modules C and A, or between C and B, (i.e., that the dual modules received different values on the clock input pins). When only one of the dual modules detects an error, the fault can be isolated to either that module, or to the clock module 11. When both modules 10, 12 detect errors, the fault can be isolated to the clock generator module.

The above description is directed to an embodiment of the invention which uses "missing phase" clock circuit. However, the invention may be implemented also with an "extra phase" clock error circuit, the only difference being that such a circuit's output would be sent to a compare register that was gated on every phase instead of on a single phase as in the described embodiment. The clock phase error circuit 15 that is depicted in FIG. 3 is representative of known technology and designs for detecting missing clock phases. As noted above, conventional extra phase clock detectors may be substituted for the missing phase clock detectors. Alternately, a combination circuit for detecting both extra and missing phase clock signals may be employed on modules, such as the modules 10, 12, without departing from the teaching and scope of the present invention.

We claim:

1. In a system comprising clock means for supplying multiphase clock signals and at least one pair of substantially identical electronic circuit means coupled to said clock means for receiving said multiphase clock signals, the improvement comprising a clock signal fault isolation means comprising first clock error detection means for one of said electronic circuit means of a pair and a second clock error detection means for the other of said electronic circuit means of said pair and error collection means coupled to said first and second clock error detection means for receiving fault signals;

wherein said first and second error detection means each comprise, a plurality of clock sensor means on each electronic circuit means each of which are coupled to receive said multiphase clock signals, and each clock sensor means provides a series of sensed signals which are representative of said multiphase clock signals of its associated electronic circuit means, and first and second residue code generator means both of which are coupled to receive said sensed signals from both of said first and second clock error detection means, said first residue code generator means being constructed to generate first code signals of a first modulo, and second residue code generator means being constructed to generate second code signals of a second modulo different than said first modulo, first comparison means having inputs coupled to receive both of said first code signals for comparing said first code signals from each of said electronic circuit means, second comparison means having inputs coupled to receive both of said second code signals for comparing said second code signals from each of said electronic circuit means and error indicating means coupled to said first and second comparison means for indicating any clock phase signal errors that may have occurred.

2. In a system as claimed in claim 1 the improvement wherein said clock sensor means are clocked by said clock means so that said clock detector means function as missing phase detectors.

3. In a system as claimed in claim 1 the improvement wherein said clock sensor means are clocked by said clock means so that said clock detector means function as extra phase detectors.

4. In a system as claimed in claim 1 the improvement wherein said first and second comparison means are activated upon the occurrence of the same preselected clock phase signal of said multiphase clock signals.

5. In a system as claimed in claim 4 the improvement wherein said clock sensor means are clocked by said clock means so that said clock detector means function as missing phase detectors.

6. In a system as claimed in claim 4 the improvement wherein said clock sensor means are clocked by said clock means so that said clock detector means function as extra phase detectors.

7. In an apparatus for detecting and isolating fault conditions within a digital electronic system, comprising:
- (a) a first digital logic array for generating digital output signals in response to digital signal inputs thereto;
- (b) a second digital logic array, identical to said first array, said second array normally receiving as its inputs, the digital signal inputs to said first array and producing digital output signals in response to said digital signal inputs;
- (c) means for operating said first and second arrays in synchrony to normally produce identical digital outputs in the absence of a fault condition occurring in said first array;
- (d) first residue code generating means coupled to receive said digital outputs of said first array;
- (e) second residue code generating means coupled receive said digital outputs of said first array, the modulo of said second residue code generating means being different from the modulo of said first residue code generating means;
- (f) third residue code generating means, identical to said first residue code generating means coupled to receive said digital outputs from said second array;
- (g) fourth residue code generating means, identical to said second residue code generating means coupled to receive said digital outputs from said second array;
- (h) first comparator means coupled to the output of said first and third residue code generating means for detecting inequality between the residue codes issued by said first and third residue code generating means;
- (i) second comparator means coupled to the output of said second and fourth residue code generating means for detecting inequality between the residue codes issued by said second and fourth residue code generating means; and
- (j) combinatorial logic means for providing an output signal indicative of a fault condition when either said first or said second comparator means produces an output indicative of inequality between respective residue codes, the improvement wherein said system employs a multiphase clock and said first and second digital logic arrays each comprise:

clock error sensor means each of which are coupled to a plurality of locations in said apparatus in order to receive predetermined combinations of said multiphase clock signals as digital input signals, wherein said clock error sensor means are constructed to supply said digital output signals which are derived from said digital input signals, and wherein said plurality of locations are predetermined locations in said arrays.

8. An apparatus as claimed in claim 7 wherein said clock error sensor means is constructed to detect missing clock phases.

9. An apparatus as claimed in claim 7 wherein said clock error sensor means is constructed to detect extra clock phases.

10. An apparatus as defined in claim 7 wherein said clock error sensor means comprises a plurality of,
- (a) separate clock fault sensor means equal in number to the number of phases of said multiphase clock wherein each of said clock fault sensor means is coupled to receive a different one of the clock phases of said multiphase clock, and each of said clock phases provides one of said digital input signals, and
- (b) detector means coupled to said clock fault sensor means which is constructed to generate said digital output signals.

11. In an apparatus as claimed in claim 10 the improvement wherein said detector means detects missing clock phases.

12. In an apparatus as claimed in claim 11 the improvement wherein said detector means detects extra clock phases.

* * * * *